(12) United States Patent
Tran et al.

(10) Patent No.: US 12,135,997 B1
(45) Date of Patent: Nov. 5, 2024

(54) WORKLOAD REQUEST RATE CONTROL

(71) Applicant: Teradata US, Inc., San Diego, CA (US)

(72) Inventors: Hoa Thu Tran, Escondido, CA (US); Daniel David Hoffman, San Diego, CA (US); Douglas P. Brown, Rancho Santa Fe, CA (US); Kenneth Ray Shortes, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 16/536,485

(22) Filed: Aug. 9, 2019

Related U.S. Application Data

(60) Provisional application No. 62/786,845, filed on Dec. 31, 2018.

(51) Int. Cl.
| | | |
|---|---|---|
| G06F 9/50 | (2006.01) | |
| G06F 9/48 | (2006.01) | |
| G06F 9/54 | (2006.01) | |

(52) U.S. Cl.
CPC ............ *G06F 9/505* (2013.01); *G06F 9/4881* (2013.01); *G06F 9/5044* (2013.01); *G06F 9/546* (2013.01); *G06F 9/5038* (2013.01); *G06F 2209/503* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 7,941,578 | B2* | 5/2011 | Kimoto | H04L 47/10 710/52 |
| 9,424,088 | B1* | 8/2016 | Richard | H04L 47/60 |
| 2001/0039575 | A1* | 11/2001 | Freund | G06F 9/465 709/223 |
| 2002/0143847 | A1* | 10/2002 | Smith | G06F 9/4881 718/103 |
| 2004/0139433 | A1* | 7/2004 | Blythe | G06Q 50/06 718/100 |
| 2005/0097556 | A1* | 5/2005 | Code | G06F 9/4881 718/102 |
| 2007/0064711 | A1* | 3/2007 | Wang | G06F 3/0605 370/395.4 |
| 2007/0276933 | A1* | 11/2007 | Lee | H04L 47/724 709/223 |
| 2008/0306950 | A1* | 12/2008 | Richards | G06F 16/21 |

(Continued)

*Primary Examiner* — Abu Zar Ghaffari
(74) *Attorney, Agent, or Firm* — Randy L. Campbell, Jr.

(57) ABSTRACT

A data store system may include a storage device configured to store a plurality of data store tables and may include a processor in communication with the storage device. The processor may receive a plurality of requests. For each request, the processor may: (1) determine an associated workload type for the request; (2) determine a first respective rate at which the request is to be released for scheduling of execution; and (3) release the request for scheduling of execution based on the first respective rate. For each released request, the processor may: (1) determine a second respective rate based on the associated workload type at which each released request is scheduled to be executed; and (2) in response to execution being scheduled for a released request, execute the released request. A method and computer-readable medium are also disclosed.

20 Claims, 6 Drawing Sheets

(56) References Cited

U.S. PATENT DOCUMENTS

| | | | |
|---|---|---|---|
| 2011/0225583 A1* | 9/2011 | Suh | G06F 9/4843 |
| | | | 718/1 |
| 2011/0295995 A1* | 12/2011 | Diao | H04L 65/105 |
| | | | 709/224 |
| 2012/0020368 A1* | 1/2012 | Sundararaman | H04L 49/254 |
| | | | 370/412 |
| 2012/0023295 A1* | 1/2012 | Nemawarkar | H04L 49/101 |
| | | | 711/130 |
| 2012/0254413 A1* | 10/2012 | Wang | H04L 67/1097 |
| | | | 709/224 |
| 2013/0191841 A1* | 7/2013 | Gibson | G06F 9/4881 |
| | | | 718/104 |
| 2013/0311996 A1* | 11/2013 | Fetterman | G06F 9/5016 |
| | | | 718/102 |
| 2013/0346994 A1* | 12/2013 | Chen | G06F 9/5044 |
| | | | 718/104 |
| 2014/0129864 A1* | 5/2014 | Sun | G06F 9/4843 |
| | | | 713/324 |
| 2015/0149622 A1* | 5/2015 | Umanesan | H04L 43/08 |
| | | | 709/224 |
| 2015/0378776 A1* | 12/2015 | Lippett | G06F 9/466 |
| | | | 718/101 |
| 2016/0062798 A1* | 3/2016 | Lee | G06F 9/5094 |
| | | | 718/104 |
| 2016/0283274 A1* | 9/2016 | Kochunni | G06F 9/5022 |
| 2017/0220383 A1* | 8/2017 | Raj | G06F 9/4881 |
| 2018/0307533 A1* | 10/2018 | Tian | G06F 9/4887 |
| 2018/0321971 A1* | 11/2018 | Bahramshahry | G06F 9/4881 |
| 2018/0329741 A1* | 11/2018 | Yuan | G06F 1/3228 |
| 2018/0336063 A1* | 11/2018 | Nakada | G06F 9/4881 |
| 2019/0370059 A1* | 12/2019 | Puthoor | G06F 9/5038 |
| 2020/0042349 A1* | 2/2020 | Jain | G06F 9/546 |
| 2020/0177661 A1* | 6/2020 | Li | H04L 65/80 |

* cited by examiner

WORKLOAD REQUEST RATE CONTROL

CLAIM OF PRIORITY

This application claims the benefit of priority under 35 U.S.C. § 119(e) of U.S. Provisional Patent Application Ser. No. 62/786,845 filed on Dec. 31, 2018, which is hereby incorporated by reference herein in its entirety.

BACKGROUND

Robust data store systems are required to handle various types of workloads, which may contain queries, utilities, and other data store tasks. These workloads may vary in content as well as source. The content and source may be used to determine execution priority in the data store system. Priority levels may be assigned to specific workload types, which allows the data store system to prioritize the execution workloads based on content. For example, tactical queries such as a customer searching online for an airline flight may require immediate execution by a data store system in order to respond to the customer in a timely manner. Similarly, priority levels may be assigned to sources of workloads as well, which allows workload execution to be based on particular users from which the workload originated. For example, an organization may desire to give priority to executive-level team members as compared to other members of the organization. Assigning higher priority levels to workloads originating with these executive-level team members allows the data store system to prioritize the execution of these as compared to other workloads.

In order to effectively manage these workload prioritizations, rules may be created to set various concurrency limits for different types of workloads. Each workload may include one or more requests, which may be one or more queries and/or utilities. Workload requests may be throttled to control the rate of execution. When a throttle limit is reached, requests included in a workload may be put on a delay queue until the limit is no longer exceeded. When there is a surge in the number of incoming requests, the delay queue can become overly long and it is difficult to obtain information about a specific delay request. In addition, delay queue statistics may be used to calculate efficiency metrics, which may become skewed if the queue becomes too cumbersome. Thus, it may be desirable to control the flow of requests to the delay queue in order to manage its size to alleviate these issues.

SUMMARY

According to one aspect of the disclosure, a data store system may include a storage device configured to store a plurality of data store tables. The data store system may further include a processor in communication with the storage device. The processor may receive a plurality of requests. Each request of the plurality of requests is a request to perform an action on at least one data store table of the plurality of data store tables. For each request, the processor may determine an associated workload type for the request, determine a first respective rate at which the request is to be released for scheduling of execution, and release the request for scheduling of execution based on the first respective rate. For each released request, the processor may determine a second respective rate based on the associated workload type at which each released request is scheduled to be executed. For each released request, the processor may, in response to execution being scheduled for a released request, execute the released request.

According to another aspect of the disclosure, a method may include receiving, with a processor, a plurality of requests. Each request of the plurality of requests is a request to perform an action on at least one data store table of a plurality of data store tables stored in a storage device. The method may further include, for each request, determining, with the processor, an associated workload type for the request. The method may further include, for each request, determining, with the processor, a first respective rate at which the request is to be released for scheduling of execution. The method may further include, for each request, releasing, with the processor, the request for scheduling of execution based on the first respective rate. The method may further include, for each released request, for each released request, determining, with the processor, a second respective rate based on the associated workload type at which each released request is scheduled to be executed. The method may further include, for each released request, in response to execution being scheduled for a released request, executing, with the processor, the released request.

According to another aspect of the disclosure a computer-readable medium may be encoded with a plurality of instructions executable by the processor. The plurality of instructions may include instructions to receive a plurality of requests. Each request of the plurality of requests is a request to perform an action on at least one data store table of a plurality of data store tables stored in a storage device. The plurality of instructions may further include, for each request, instructions to determine an associated workload type for the request. The plurality of instructions may further include, for each request, instructions to determine a first respective rate at which the request is to be released for scheduling of execution. The plurality of instructions may further include, for each request, instructions to release the request for scheduling of execution based on the first respective rate. The plurality of instructions may further include, for each released request, determining, with the processor, a second respective rate based on the associated workload type at which each released request is scheduled to be executed. The plurality of instructions may further include, for each released request, in response to execution being scheduled for a released request, executing, with the processor, the released request.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
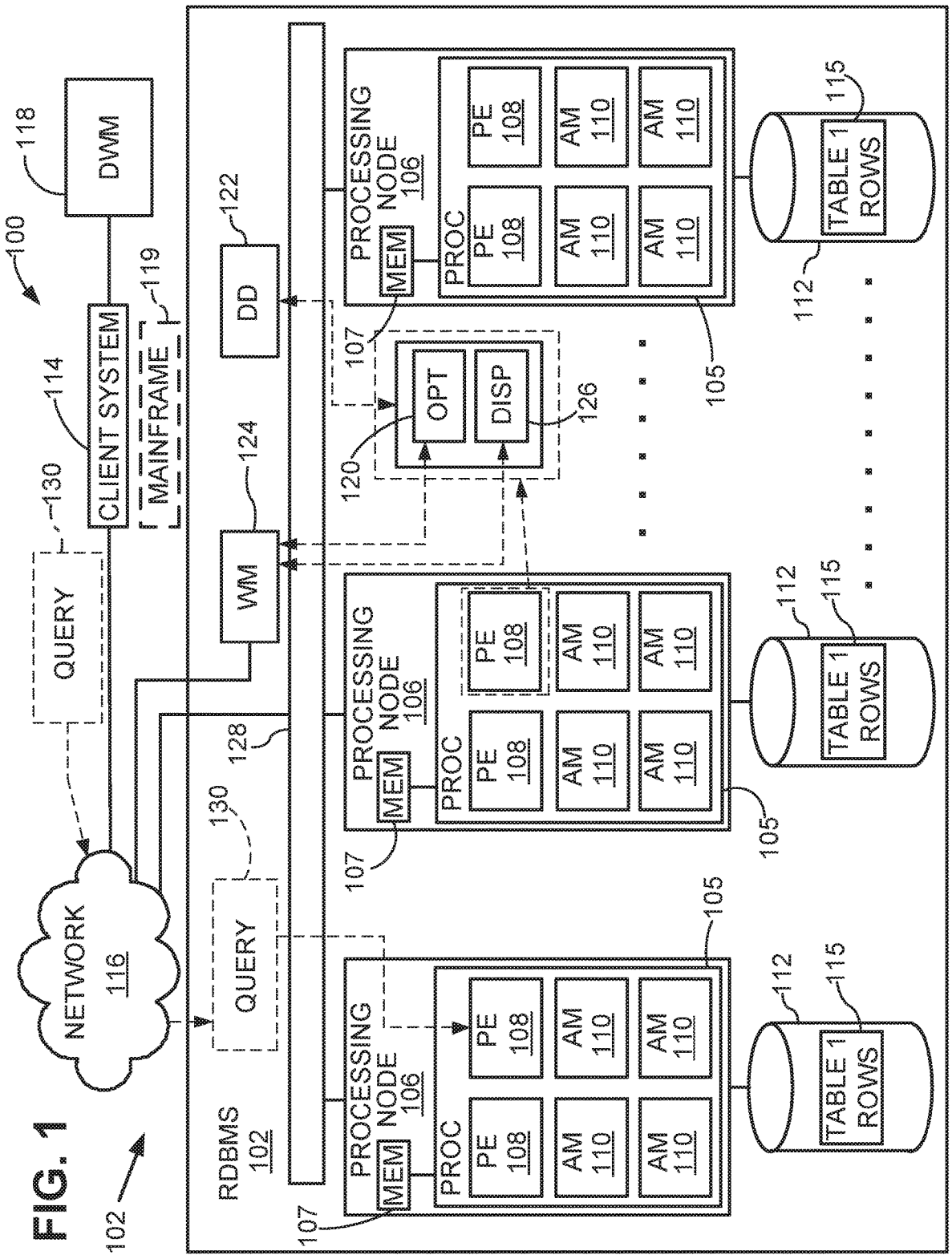
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, each module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include memory hardware, such as a portion of the memory 107, for example, that comprises instructions executable with the processor 105 or other processor to implement one or more of the features of the module. When any one of the modules includes the portion of the memory 107 that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processing nodes 106 or may be stored and executed on separate memories and processors that are in communication with the processing nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 4:
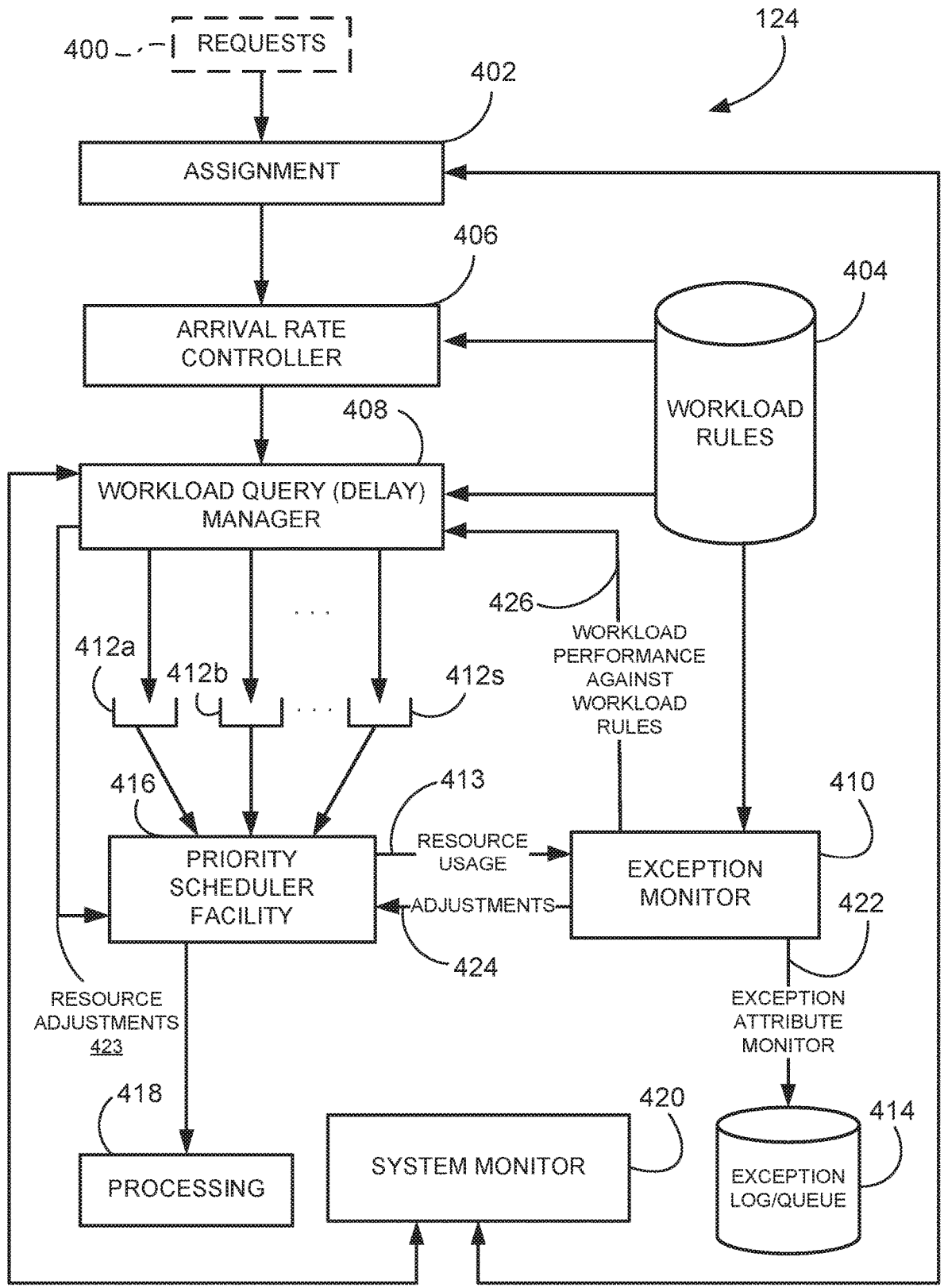
FIG. 4 is an example of workload management.
Figure 5:
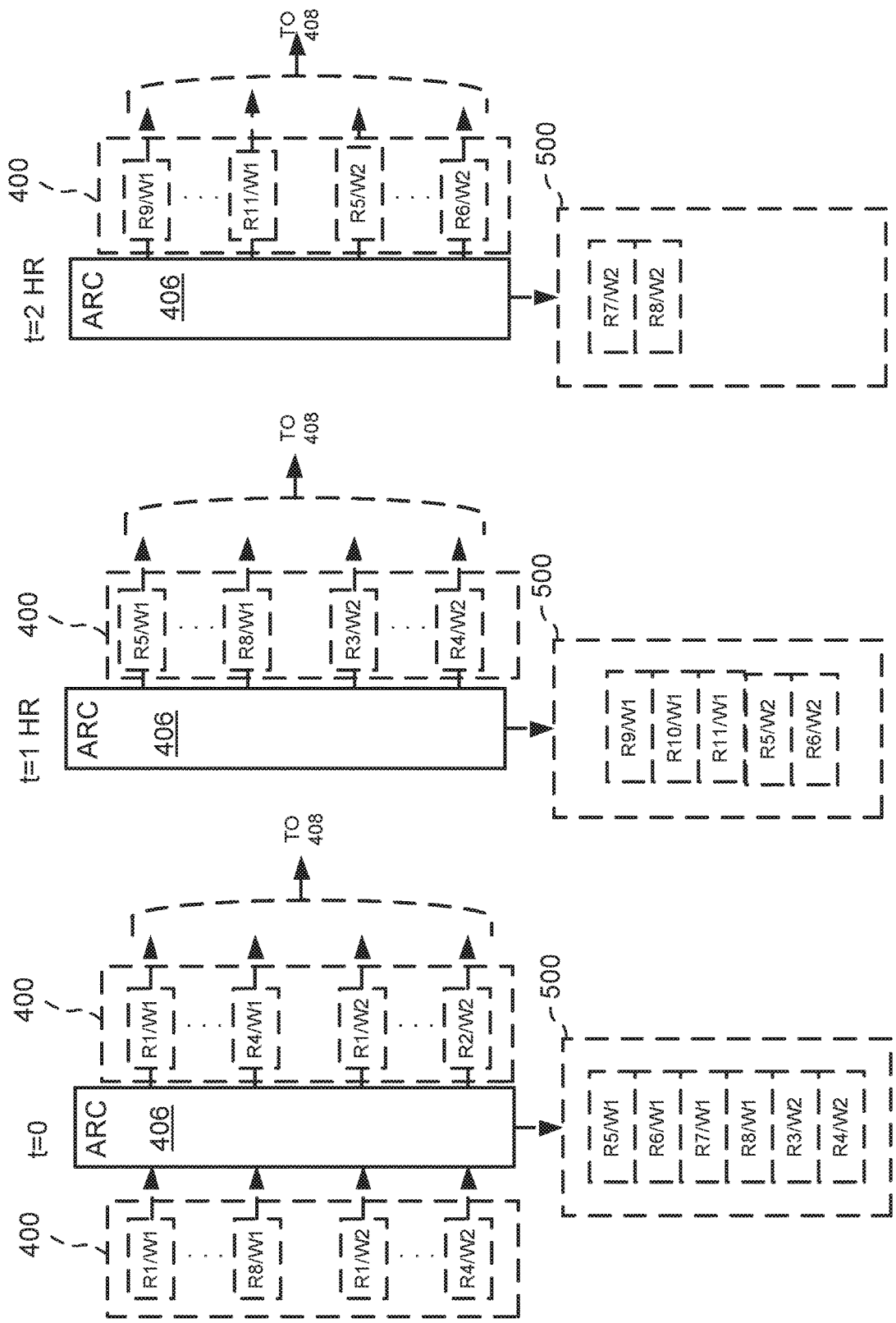
FIG. 5 is an example of request flow control over a period of time.
Figure 6:
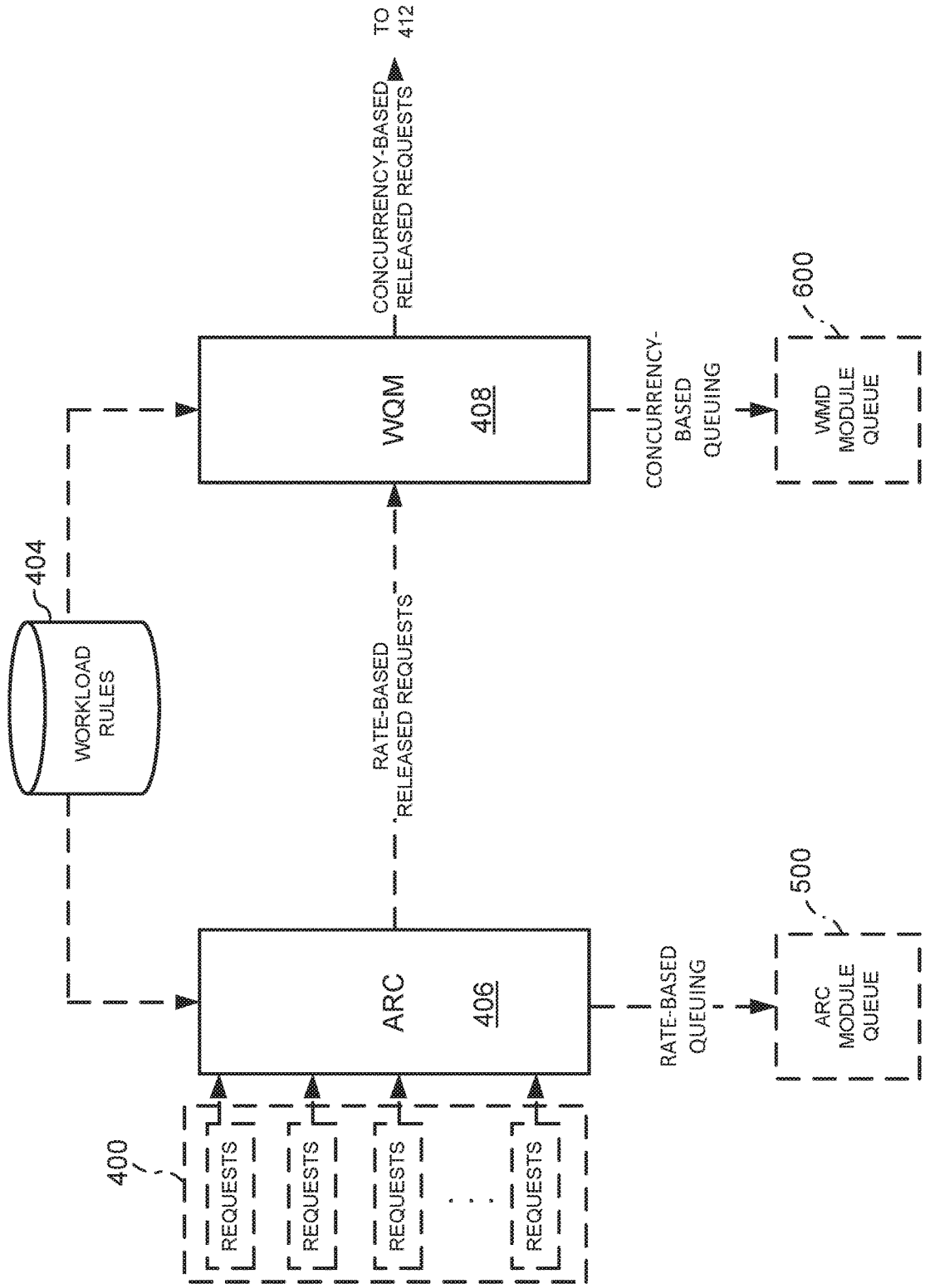
FIG. 6 is an example request flow control in a workload management environment.

The RDBMS 102 may include a workload management (WM) module 124, which is described in further detail in FIGS. 4-6. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with an optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. The DWM client 118 may communicate with the WM module 124 via the network 116.

The RDBMS 102 described herein accepts performance goals for each workload as inputs, and dynamically adjusts its own performance, such as by allocating RDBMS 102 resources and throttling back incoming work. Performance parameters may be referred to as priority scheduler parameters. In one example, the priority scheduler may optionally implement multiple virtual partitions to allocate certain portions of resources (such as CPU, disk, and memory) by geographical entities or business units if they require strict separations and limits. Each virtual partition may implement multiple priority levels with appropriate resources. Each workload is assigned to a specific priority level possibly with its allocation of resources within its priority level. Thus, the amount of resources that a workload receives depends on its assigned priority level within a virtual partition. For example, some requests may be associated with tasks of a more critical nature as compared to other requests. To ensure these types of requests receive a proper amount of resources, the associated workload of these critical-task requests may be assigned to the highest priority level (e.g. in a virtual partition that provides more resources compared to other virtual partitions if there are multiple virtual partitions). Requests of a less-critical nature may be associated with workloads assigned to lower priority levels. Given performance objectives for each workload and the fact that the workloads may interfere with each other's performance through competition for shared resources, the RDBMS 102 may find a performance setting that achieves one workload's goal but makes it difficult to achieve another workload's goal. Workloads may contain one or more of queries and/or utilities received from a particular source. In one example, the workloads may be prioritized based on a number of configurable parameters such as user names, profiles, query characteristics, query types, databases, tables, applications, etc. The performance goals for each workload will vary widely as well and may or may not be related to their resource demands. For example, two workloads that execute the same application could have differing performance goals simply because they were submitted from different departments in an organization. Conversely, even though two workloads have similar performance objectives, they may have very different resource demands.

The operation of the WM 124 may include four major phases: 1) assigning a set of incoming request characteristics to workloads which have been defined with appropriate priority classes, and assigning goals (called Service Level Goals or SLGs); 2) monitoring the execution of the workloads against their goals; 3) regulating (adjusting and managing) the workload flow and priorities to achieve the SLGs; and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions; 2) through capacity planning recommendations, for example increasing system power; 3) through utilization of results to enable optimizer self-learning; and 4) through recommending adjustments to SLGs of one workload to better complement the SLGs of another workload that it might be impacting. All recommendations can either be enacted automatically, or through manual input.

Figure 2:
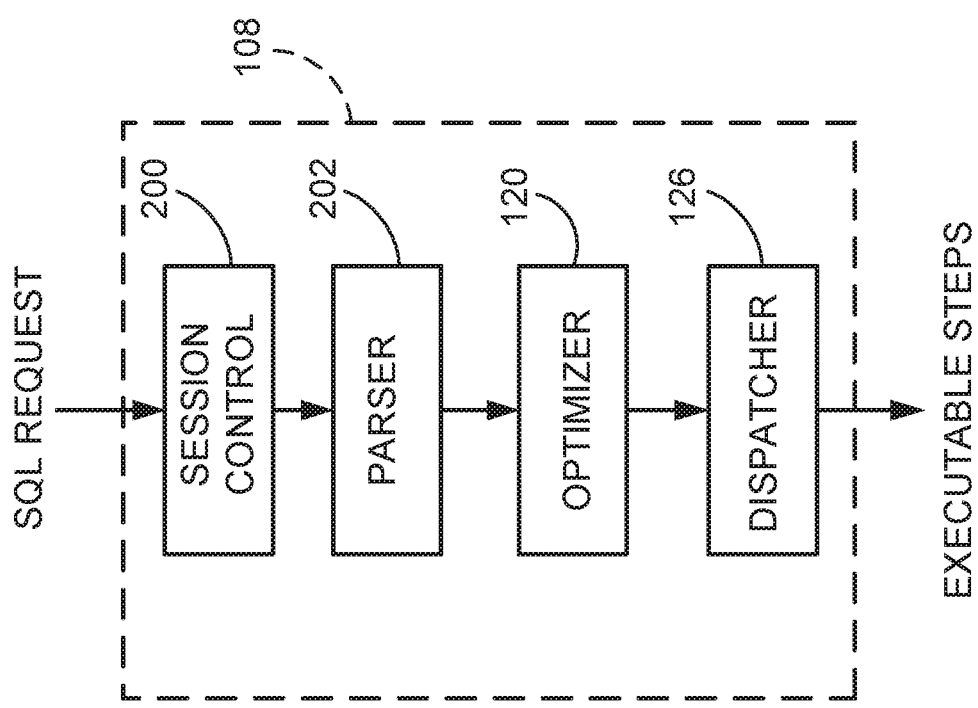
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, a SQL request may be received such as through submission by a user and the SQL request is routed to the parser module 202.

Figure 3:
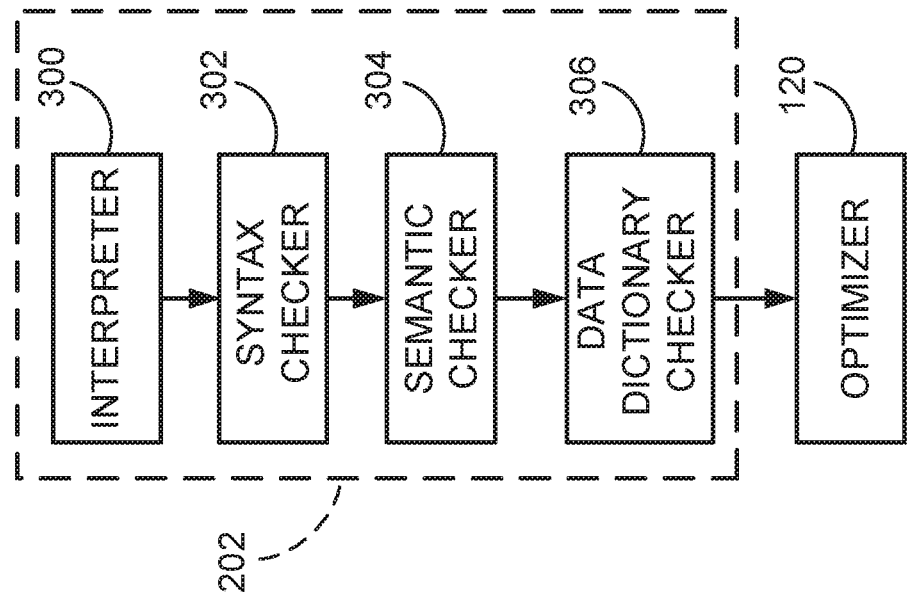
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 monitoring takes place by communicating with the dispatcher module 126 as it checks the query execution step responses from the access modules 110 or periodically. The step responses include the actual cost information, which the dispatcher module 126 may then communicate to the WM 124 which, in turn, compares the actual cost information with the estimated costs of the optimizer module 120.

FIG. 4 is an example of workload regulation as performed by the WM 124. In one example, the WM 124 may receive requests 400, which may include any combination of one or more queries and/or utilities. The requests 400 may be received by an assignment module 402 of the WM module 124, which may assign the request 400 to a workload, in accordance with the workload rules 404. The assigned requests are passed to an arrival rate controller (ARC) module 406, which is described in further detail in FIG. 5. In one example, the ARC module 406 may determine workload-specific rates at which workloads that are released to a workload query (delay) manager (WQM) module 408 over a predetermined time interval. In one example, the WQM module 408 may monitor the workload performance from the exception monitor 410, as compared to the workload rules 404, and either allows the request to be executed immediately or places it in a queue for later execution, as further described in FIG. 6, when predetermined conditions are met.

If the request 400 is to be executed immediately, the WQM module 408 places the requests in buckets 412a . . . s, where s represents the total number of buckets, corresponding to the workloads to which the requests 400 were assigned. A request processor function performed under control of a priority scheduler facility (PSF) module 416 selects queries from the workload buckets 412a . . . s in an order determined by the priority associated with each of the buckets 412a . . . s, which are executed, as represented by the processing module 418 in FIG. 4. The PSF module 416 also monitors the request processing and reports resource usage 413 for example, for each request 400 and for each workload, to the exception monitor 412. Also included in the WM 124 is a system condition monitor 420, which is provided to detect system conditions 421, such as processing node failures. The exception monitor 410 and system monitor 420 collectively define an exception attribute monitor 422.

The exception monitor 410 compares the resource usage 413 with the workload rules 404 and stores any exceptions (e.g. throughput deviations from the workload rules 404) in the exception log/queue 414. In addition, the exception monitor provides resource allocation adjustments 424 to the PSF 416, which adjusts priorities of requests that deviate greater than short-term thresholds. Further, the exception monitor 410 provides data regarding the workload performance against workload rules 426 to the WQM module 408, which uses the data to determine whether to delay incoming requests, depending on the workload to which the request is assigned.

As can be seen in FIG. 4, the system provides three feedback loops. The first feedback loop includes the PSF 416 and the exception monitor 410. In this first feedback loop, the WM module 124 monitors, on a short-term basis, the execution of requests to detect deviations greater than a short-term threshold from the defined service level for the workload to which the requests were defined. If such deviations are detected, the WQM module 408 can assign the requests to other workloads with more appropriate resources.

The second feedback loop includes the WQM module 408, the PSF 416 and the exception monitor 410. In this second feedback loop, the RDBMS 102 monitors, on a long-term basis, to detect deviations from the expected level of service greater than a long-term threshold with regard to execution of workloads. If it does, the RDBMS 102 adjusts the execution of requests, e.g. by delaying, adjusting priority (via resource adjustments 423), or aborting requests, to better provide the expected level of service.

The third feedback loop includes the ARC module 406, the PSF 416 and the exception monitor 410. In this third feedback loop, the RDBMS 102 monitors, on a long-term basis, which types of workloads are being executed and how such execution may be affecting the execution of other workloads. If a deviation is detected, the RDBMS 102 may adjust the rate at which certain workloads are released to the WQM module 408 via the ARC module 406. Allowing the ARC module 406 to control the rate to a desired number per time unit at which workload-specific requests are released to the WQM module 408 controls the number of workload-specific requests dealt with by the WQM module 408. In other examples, the ARC module 406 may statically control the rate per time unit in which workload-specific requests 400 are released to the WQM module 408. In such a scenario, the ARC module 406 may deliver requests 400 at constant rates to the WQM module 408 with respect to the associated workload. This allows the RDBMS 102 to control delivery rate of requests of a specific work regardless of the current operating conditions of the RDBMS 102.

While the PSF 416 operates to achieve resource management goals, the RDBMS 102 may also include the capability to throttle back incoming work to keep the particular workload concurrency levels low, and not misallocate shared resources, spools, virtual processor dedication, etc., from higher priority workloads. Throttling based on concurrency does not always provide all the power, granularity or dynamics needed to properly manage workload resources. This is especially a problem when a workload is comprised of a heterogeneous mix of requests, e.g. some being short, others being long, or in an environment of frequent arrival rate surges and lulls.

In one example, the ARC module 406 and the WQM module 408 may operate as arrival rate workload throttles (also known simply as arrival rate throttles), wherein the PSF 416 regulates execution of the requests 400 using the arrival rate throttle techniques employed by the ARC module 406 and the WQM module 408. The arrival rate throttles provide a capability to throttle back and forward the execution of the requests 400 so as to manage workload levels. The ARC module 406 may queue and release incoming requests 400 to the WQM module 408 at a particular rate per time unit based on how execution of requests is affecting other requests associated with different workloads. The ARC module 406 may also queue and release requests 400 of particular workloads at a predetermined static rate, which may be selectively adjusted by the RDBMS 102. In other examples, the ARC module 406 may use both static-based and dynamic-based delivery rates across different workloads.

FIG. 5 is a block diagram of example operation of the ARC module 406 over a two-hour period of time. In one example, the ARC module 406 may receive requests 400 each of which is associated with one of two workloads, workload W1 and W2. The ARC module 406 may control rates at which requests 400 are released based on parameters set with regard to a particular workload. The rates may be based on predetermined rates associated with a particular workload or based on dynamic conditions of the RDBMS 102. In the example of FIG. 5, the ARC module 406 may release requests based on rates associated with workloads W1 and W2. In particular, requests associated with workload W1 may be released by the ARC module 406 at a rate of four every hour, while requests associated with workload W2 are released at a rate of two every hour.

As shown at time t=0, requests R1 through R8 from workload W1 (designated as R1/W1 through R1/W8) and requests R1 through R4 from workload W2 (designated as R1/W2 through R4/W2) arrive. In the scenario that no requests associated with workloads W1 and W2 have been received by the ARC module 406 within at least an hour, the ARC module 406 may release requests R1/W1 through R4/W1 at time t=0 to the WQM module 408. The ARC module 406 may also release requests R1/W2 and R2/W2 to the WQM module 408. The remaining requests, R5/W1 through R8/W1, R3/W2, and R4/W2 may be stored in a queue 500 until release.

At time t=1 hour, the ARC module 406 may release requests R5/W1 through R8/W1, and requests R3/W2 and R4/W2. During the course of the hour, requests R9/W1 through R11/W1 and R5/W2 through R6/W2 have arrived at the ARC module 406 and remain in the queue 500. At time t=2 hours, additional requests from workload W2, requests R5/W2 and R6/W2, are released to the WQM module 408. Since another hour has passed, requests from workload W1 may also be released, which includes requests R9/W1 through R11/W1. During the second hour, the ARC module 406 receives requests R7/W2 and R8/W2 which are stored in the queue 500. In the example of FIG. 5, requests 400 which are held in the queue 500 are released to the WQM module 408 based on either arrival time to the ARC module 406 or priority levels of the requests 400

FIG. 6 is an example of operation by the ARC module 406 and the WQM module 408. The ARC module 406 may receive requests 400. Based on the workload rules 404, the ARC module 406 may determine the rate at which each request 400 is to be released to the WQM module 408. If a request 400 is to be released, the ARC module 406 may release the request 400. If release of a request 400 would violate the rate at which requests from that workload are to be released, the request 400 may be queued in the ARC module queue 500. The ARC module 406 may also reject requests based on workload rules. Rejection of a request 400 may result in a rejection message being sent to the source of the request (such as an error message to an application or a user interface of a database administrator, for example) notifying the source of the rejected request 400. In some examples, only a predetermined number of requests 400 from a specific source or of a specific workload type may be released from the ARC module queue 500. Control of the ARC module queue 500 in this manner ensures no single workload-type or originating source can dominate the WQM queue 600 in the event of numerous requests 400 originating from the same or workload-related sources.

Figure 7:
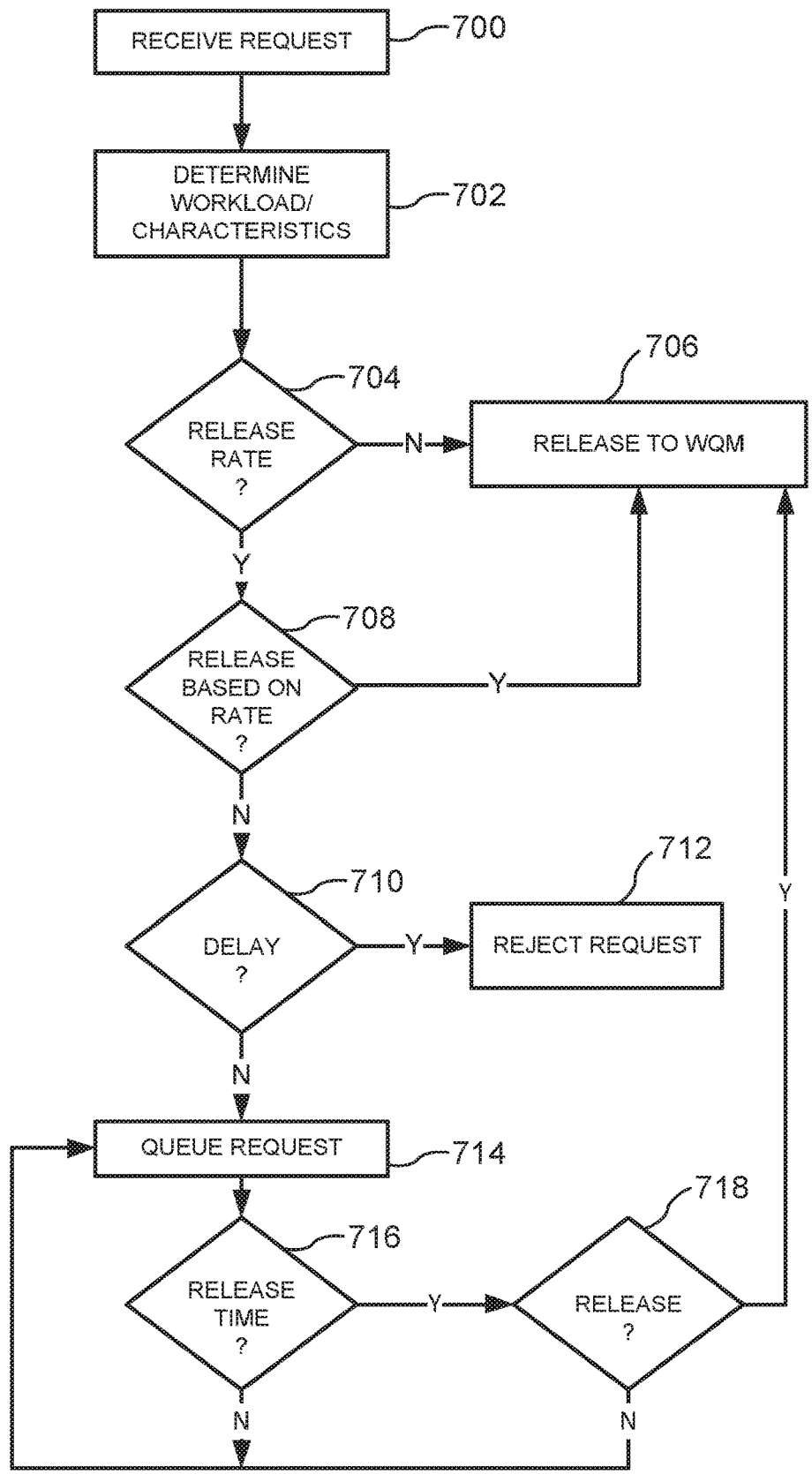
FIG. 7 is an operational flow diagram of a database system during request handling.

FIG. 7 is an operational flow diagram of the ARC module 406 during processing of a request 400. In one example, the ARC module 406 may receive a request 400 (700). The ARC module 406 may determine the workload and/or characteristics associated with the request 400 (702). The ARC module 406 may determine if the workload and/or characteristics of the request 400 is associated with release rate control (704). If not, the request 400 may be released to the WQM module 408 to be processed accordingly (706). If the workload and/or characteristics of the request 400 is associated with a release-rate (704), the ARC module 406 may determine if the request 400 is to be released in accordance with the workload-based or request-characteristics-based release rate. If release of the request 400 is determined to not violate the number of requests to be released within the parameters of the rate, the ARC module 406 may release the request 400 to the WQM module (706).

If the request 400 is not to be released based on the workload-related rate (708), the ARC module 406 may determine if the rate control action is to reject or delay (710). In one example, the action of rate control rule A (which may be workload- or characteristic-based) may be to reject request 400 when the rate of rule A is exceeded. In other examples, the action of rate control rule B may be to delay request 400 when the rate of rule B is exceeded. If the ARC module 406 determines to delay the request 400 (710), the request 400 may be queued (714). Rejection of the request 400 (712) may result in one or more messages being generated to notify a source of the request 400 and/or other entity.

In the event the request 400 is queued, the ARC module 406 may determine when request-release time occurs indicating when request of a workload associated with the request 400 are to be released (716), such as when a predetermined release-rate for the workload is monitored by the ARC module 406. Upon the release time occurrence, the ARC module 406 may determine if the queued request 400 is to be released (718). If the request 400 is not to be released, it may remain queued (714). This may occur if other requests were in the queue longer than the request 400 and are to be released ahead of the request 400 and release of the requests 400 would violate a rate-based rule for releasing requests. If the request 400 is to be released, the ARC module 406 may release the request 400 to the WQM module 408 (706).

The examples herein have been provided with the context of a relational database system. However, all examples are applicable to various types of data stores, such as file systems or other data stores suitable for organization and processing of data, such as analytic platforms. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A data store system comprising:
   a storage device configured to store a plurality of data store tables;
   a processor in communication with the storage device, the processor configured to:
   receive a plurality of requests, wherein each request of the plurality of requests is a request to perform an action on at least one data store table of the plurality of data store tables;
   for each received request:
   determine an associated workload type for the received request;
   determine a first respective release rate, wherein the first respective release rate is based on the received request, wherein the first respective release determines when the received request is to be released to be scheduled for execution, wherein the received request is queued in a first queue until released in accordance with the first respective release rate; and
   release the received request to be selected for execution based on the first respective release rate;
   for each released request:
   determine a second respective rate based on the associated workload type at which the released request is to be submitted for execution, wherein the second respective rate determines a rate at which released requests of the associated workload type are to be submitted for execution;
   in response to the determination of the second respective rate, determine one of the released request is to be submitted for execution of the selected released request and the released request is to be queued in a second queue until submitted for execution; and
   in response to the determination that the released workload is to be submitted for execution, submit the released workload for execution, wherein the submitted released workload is to be executed with respect to other workloads submitted for execution based on a respective priority level of the associated workload type of the released workload, wherein the respective priority level of the associated workload type is different than other respective priority levels of other respective workload types.

2. The data store system of claim 1, wherein the processor is further configured to:
   determine at least one respective characteristic about each received request; and
   for each received request, determine the first respective release rate for the request based on the at least one respective characteristic about the request.

3. The data store system of claim 2, wherein the at least one respective characteristic of each received request is a source of the received request.

4. The data store system of claim 1, wherein the processor is further configured to, for each received request, determine the first release respective rate for the received request based on the associated workload type.

5. The data store system of claim 1, wherein the processor is further configured to:
   for each received request:
   identify at least one rule that applies to the received request; and
   determine the first respective release rate based on the at least one rule.

6. The data store system of claim 1, wherein the processor is further configured to:
   determine that the first respective release rate for at least one received request is a predetermined static rate; and
   release the at least one received request to be scheduled for execution based on the predetermined static rate.

7. The data store system of claim 1, wherein the processor is further configured to:
   for each received request not released to be scheduled for execution;
   determine if the first queue has capacity to accept requests; and
   in response to the determination that the first queue has capacity, queue the request.

8. A method comprising:
   receiving, with a processor, a plurality of requests, wherein each request of the plurality of requests is a request to perform an action on at least one data store table of a plurality of data store tables stored in a storage device;
   for each received request:
   determining, with the processor, an associated workload type for the received request;
   determining, with the processor, a first respective release rate, wherein the first respective release rate is based on the received request, wherein the first respective release rate determines when the received request is to be released for scheduling of execution, wherein the received request is queued in a first queue until released in accordance with the first respective release rate; and
   releasing, with the processor, the received request to be selected for execution based on the first respective release rate;
   for each released request:
   determining, with the processor, a second respective rate based on the associated workload type at which the released request is to be submitted for execution, wherein the second respective rate determines a rate at which released requests of the associated workload type are to be submitted for execution;
   in response to the determination of the second respective rate, determine, with the processor, one of the released request is to be submitted for execution of the selected released request and the released request is to be queued in a second queue until submitted for execution; and
   in response to the determination that the released workload is to be submitted for execution, submitting, with the processor, the released workload for execution, wherein the submitted released workload is to be executed with respect to other workloads submitted for execution based on a respective priority level of the associated workload type of the released workload, wherein the respective priority level of the associated workload type is different than other respective priority levels of other respective workload types.

9. The method of claim 8 further comprising:
   determining, with the processor, at least one respective characteristic about each received request; and
   for each received request, determining, with the processor, the first respective release rate for the request based on the at least one respective characteristic about the request.

10. The method of claim 9, wherein the at least one respective characteristic of each received request is a source of the received request.

11. The method of claim 8 further comprising, for each received request, determining, with the processor, the first respective release rate for the received request based on the associated workload type.

12. The method of claim 8, further comprising:
for each received request:
identifying, with the processor, at least one rule that applies to the received request; and
determining, with the processor, the first respective release rate based on the at least one rule.

13. The method of claim 8 further comprising:
determining, with the processor, that the first respective release rate for at least one received request is a predetermined static rate; and
releasing, with the processor, the at least one received request for scheduling of execution based on the predetermined static rate.

14. The method of claim 8 further comprising:
for each received request not released for scheduling of execution;
determining, with the processor, if the first queue has capacity to accept requests;
in response to the determination that the first queue has capacity, queuing, with the processor, the request in the first queue.

15. A non-transitory computer-readable medium encoded with a plurality of instructions executable by the processor, the plurality of instructions comprising:
instructions to receive a plurality of requests, wherein each request of the plurality of requests is a request to perform an action on at least one data store table of a plurality of data store tables stored in a storage device;
for each received request:
instructions to determine an associated workload type for the received request;
instructions to determine a first respective release rate, wherein the first respective release rate is based on the received request, wherein the first respective release rate determines when the received request is to be released to be scheduled for execution, wherein the received request is queued in a first queue until released in accordance with the first respective rate; and
instructions to release the received request to be selected for execution based on the first respective release rate;
for each released request:
instructions to determine a second respective rate based on the associated workload type at which the released request is to be submitted for execution, wherein the second respective rate determines a rate at which released requests of the associated workload type are to be submitted for execution;
in response to the determination of the second respective rate, instructions to determine one of the released request is to be submitted for execution of the selected released; and
in response to the determination that the released workload is to be submitted for execution, instructions to submit the released workload for execution, wherein the submitted released workload is to be executed with respect to other workloads submitted for execution based on a respective priority level of the associated workload type of the released workload, wherein the respective priority level of the associated workload type is different than other respective priority levels of other respective workload types.

16. The non-transitory computer-readable medium of claim 15, wherein the plurality of instructions further comprises:
instructions to determine at least one respective characteristic about each received request; and
for each received request, instructions to determine the first respective release rate for the request based on the at least one respective characteristic about the request.

17. The non-transitory computer-readable medium of claim 16, wherein the at least one respective characteristic of each received request is a source of the received request.

18. The non-transitory computer-readable medium of claim 15, wherein the plurality of instructions further comprises, for each received request, instructions to determine the first respective release rate based on the associated workload type.

19. The non-transitory computer-readable medium of claim 15, wherein the plurality of instructions further comprises:
for each received request:
instructions to identify at least one rule that applies to the received request; and
instructions to determine the first respective release rate based on the at least one rule.

20. The non-transitory computer-readable medium of claim 15, wherein the plurality of instructions further comprises:
instructions to determine that the first respective release rate for at least one received request is a predetermined static rate; and
instructions to release the at least one received request for scheduling of execution based on the predetermined static rate.

* * * * *